Patented May 10, 1949

2,469,901

UNITED STATES PATENT OFFICE 2,469,901

PRODUCTION OF CALCIUM HYPOCHLORITE

Jerome W. Sprauer, Roslyn, Pa., assignor to The Pennsylvania Salt Manufacturing Company, Philadelphia, Pa., a corporation of Pennsylvania No Drawing. Application November 24, 1945, Serial No. 630,705

7 Claims. (Cl. 23—86)

This invention relates to the production of commercially pure calcium hypochlorite. This application is related in subject matter to my co-pending application 630,706 filed the same day as this application.

The art of manufacture of calcium hypochlorite is old and well known. However, all previously known processes for producing neutral calcium hypochlorite suffer from the technological disadvantage of producing a difficultly filterable material which is hard to separate and wash. This has resulted in relatively costly methods of processing and in production of less pure materials than desirable. For example, in the well known chlorination of a concentrated aqueous suspension of hydrated lime, it has been found expedient, in order to obtain a suspension of better filterability, to chlorinate only incompletely to produce a suspension of mixed basic calcium hypochlorite and neutral calcium hypochlorite crystals, thus producing a final product which contains a relatively high proportion of hydroxide. Also, to obtain as complete a separation as possible of the desired calcium hypochlorite solids from the solution phase, which contains the undesired calcium chloride, resort has been had to the costly operation of hydraulic pressing. Chlorination of a concentrated aqueous mixture of hydrated lime and caustic soda, and similar process variations, were developed in an attempt to obviate the disadvantages concomitant to the relatively poor filterability of neutral calcium hypochlorite. In this process the solution phase of the final chlorinated suspension contains sodium chloride rather than calcium chloride; it was felt that sodium chloride was less objectionable and need not be separated so completely to produce the desired commercial product. In such processes the difficult filtration is frequently entirely omitted, the final chlorinated suspension or solution being dried as a whole. This method has the great disadvantage of producing a relatively less pure product containing only about fifty per cent calcium hypochlorite. Many other processes have been proposed and used to obviate the relatively difficult filtration (or centrifugation, pressing, or the like) of neutral calcium hypochlorite.

Several research workers have attempted to improve the filterability of neutral calcium hypochlorite with indifferent success. For example, Klopstock and Wurbs in U. S. Patent 2,007,429 proposed a process for precipitating neutral calcium hypochlorite of improved filterability by carrying out the precipitation in the presence of unusually large quantities of liquid obtained by recycling to the precipitation step waste solution from a previous precipitation and filtration. Kitchen U. S. Patent 1,937,230 claimed to produce neutral calcium hypochlorite of improved filterability by crystallizing basic calcium hypochlorite, separating these crystals, resuspending the separated basic calcium hypochlorite crystals in water and chlorinating. However, other workers have stated that with this method improvement in filterability was obtained only when the basic hypochlorite was separated in the form of well-formed hexagonal crystals of dibasic calcium hypochlorite. As will hereinafter be made apparent, these prior art workers were working along lines which did not disclose the combination of conditions necessary for producing a readily filterable product.

I have now discovered that in order to produce easily filterable crystals of neutral calcium hypochlorite by chlorinating a solution or suspension of hydrated lime or other basic solution or suspension of a calcium compound having a solubility at least as calcium hydroxide, it is important to observe the following process conditions: (1) the chlorine should be added to the solution or suspension at a rapid rate, as hereinafter numerically defined, particularly after the liquid phase has become saturated with respect to neutral calcium hypochlorite, and (2) the solution or suspension being chlorinated should be maintained substantially free of soluble sulfate, e. g. sulfate ion should be maintained below 0.3 parts by weight sulfate, calculated as $CaSO_4$, per 100 parts of Ca present, and preferably below 0.15 parts $CaSO_4$ per 100 parts of Ca. In addition, in accordance with recognized practice, the calcium chloride concentration in the liquid phase of the suspension or solution should be maintained below about 35 parts by weight $CaCl_2$ per 100 parts water and the chlorination should be carried out at a temperature below about 30° C., preferably in the range of about 10° to 25° C.

The above process conditions in combination, I have found, have a most favorable effect on whatever factors are responsible for ease of filtration of a neutral calcium hypochlorite crystal slurry. It is difficult to set up an objective criterion of filterability since ease of filtration depends upon the apparatus used, the manner in which the filtration is performed and many other factors. In whatever manner the comparison is made, however, the crystal sludge produced by following the conditions of my invention as above set forth, will show remarkably improved filterability over a product made by prior art methods.

In this connection it may be noted that in the prior art any reference to the effect of crystal size has recognized only the desirability of producing large crystals in order to obtain good filterability, whereas my studies indicate that the range of size distribution is also important. That is, crystals which fall into a comparatively narrow range of size distribution may show superior filterability to crystals of a wide size distribution even though the average crystal size is larger in the latter case.

Maintaining the conditions of my invention as above outlined results generally in the production of a large average size of crystal; for example in a typical operation the crystals have shown an average size of about 15 microns edge measurement. What appears to be even more important, however, is the fact that the crystals formed fall into a comparatively narrow range of size distribution; for example in a typical operation the crystals formed have all fallen substantially within the distribution range of 5 to 25 microns edge measurement. Although I do not wish to be limited to any theoretical explanation of my process, it is this production of uniformly sized as well as large average sized crystals that I believe accounts in great part for the easy filterability of sludges of neutral calcium hypochlorite made in accordance with my invention. Moreover, maintaining the conditions of my invention as above outlined results consistently in the production of well-formed, tetragonal crystals as compared to the usually rough and irregular crystal shapes of the prior art, and this may contribute importantly to the superior filterability of sludges of neutral calcium hypochlorite made in accordance with my invention. However, the important fact is that maintenance of the process conditions above outlined results in production of an easily filterable crystal sludge.

It is particularly surprising that a rapid rate of chlorination would have this result since such operation, tending as it does to increase the rate of crystallization, would be expected to favor the formation of a fine crystal mass. Moreover, in the chlorination art it has been believed that rapid addition of chlorine will cause excessive decomposition. Notwithstanding these views of the prior art I have found, as above pointed out, that the rapid addition of chlorine is an important condition in obtaining easily filterably crystals. The fact that crystal size should be so adversely affected by even extremely minor quantities of sulfate ion, i. e. such minor quantities as just above 0.3 parts by weight calcium sulfate per 100 parts by weight calcium, is also remarkable, since there is no reason for a chemist to have expected sensitivity to sulfate ion in this crystallization process.

In carrying out the process of my invention chlorine, preferably in gaseous form, is led into an aqueous solution or suspension containing calcium ion and hydroxyl ion, e. g. a suspension of hydrated lime, $Ca(OH)_2$, a suspension of a basic calcium hypochlorite which may have been made by partially chlorinating hydrated lime, or other solutions or suspensions containing calcium ion and hydroxide ion, made up, for example, employing sodium hydroxide to furnish hydroxyl ion and lime or other soluble or partially soluble calcium compound to furnish the calcium ion. In any case, as chlorination is carried on employing the process of my invention, one of the basic calcium hypochlorites will precipitate temporarily. The liquid phase of such suspension will, of course, contain calcium ions and hydroxide ions and the latter will react with the added chlorine to form hypochlorite ions, thus causing the precipitated basic calcium hypochlorite gradually to dissolve as chlorination continues. At some calcium ion and hypochlorite ion concentration characteristic of the system, the liquid phase eventually becomes saturated or supersaturated with respect to a neutral calcium hypochlorite which, after an induction period characteristic of the system, spontaneously precipitates. Usually the neutral calcium hypochlorite starts to crystallize while there is still considerable basic hypochlorite present. My studies indicate that the hydrate that precipitates has the approximate formula $Ca(OCl)_2.2.5H_2O$.

The rate of chlorine addition which, as above pointed out, is an important condition in carrying out the process of my invention, should equal at least 0.5 percent per minute and preferably 1 percent or above per minute, of the "final chlorine equivalent" of a given batch or unit quantity of solution or suspension. The "final chlorine equivalent" may be defined as twice the weight of hypochlorite chlorine that would be present if a given quantity of solution or suspension were chlorinated to completion; this is also equivalent to the amount of elemental chlorine that would have to be employed to produce this amount of hypochlorite by complete chlorination of hydroxide. Most advantageously, the rate of chlorine addition is 1 to 2% per minute of the "final chlorine equivalent." As can readily be seen, such a rate, maintained during the entire chlorination starting with hydrated lime, invokes adding the chlorine within a period of 50 to 100 minutes. It is only important to maintain this rate, however, after the liquid phase has become saturated with respect to neutral calcium hypochlorite. In general, in the precipitation of neutral calcium hypochlorite crystals from aqueous mixtures, whether by chlorination of basic mixtures, by metatheses or by other processes, the addition of the precipitation reagent should be completed within about 60 minutes, preferably within about 30 minutes, after the liquid phase of the mixture has passed the saturation point with respect to neutral calcium hypochlorite.

Either when first preparing the lime suspension or other solution or suspension containing hydroxyl and calcium ion as above described, or before chlorination has been carried substantially beyond the point of saturation with respect to neutral calcium hypochlorite, suitable precautions are taken to bring the sulfate ion content of the solution or suspension to the low value indicated. This may advantageously be done by adding an amount of barium ion, e. g. as barium chloride, adequate to precipitate the sulfate ion. The barium sulfate thus precipitated may be left in the suspension since it does not furnish enough sulfate to affect the crystallization.

Care is also taken to maintain the calcium chloride content of the liquid phase, during chlorination beyond the saturation point with respect to neutral calcium hypochlorite, at a value not greater than about 35 parts by weight calcium chloride per 100 parts by weight of water. This may be done by suitable dilution of the solution or suspension. In solutions in which substantial amounts of cations other than calcium are present, the calcium chloride concentration is to be interpreted as the equivalent of the calcium ion in excess to the hypochlorite ion concentration or as the equivalent of the chloride ion concentration, whichever is the smaller.

As above pointed out, the temperature during chlorination beyond the saturation point with respect to neutral calcium hypochlorite is maintained below about 30° C., preferably below 25° C. A temperature in the range of about 10 to 25° C. has been found to be most advantageous.

It is also desirable to maintain suitable fluidity of the suspension during crystal formation, for effective stirring. When the process is carried out by complete chlorination of an aqueous lime suspension sufficiently diluted to prevent calcium chloride rising above 35 parts by weight per 100 parts by weight of water, that is, by chlorination of a lime suspension containing not more than about 33% by weight Ca(OH)$_2$, the suspension obtained will be sufficiently fluid. However, since the fluidity of the basic calcium hypochlorite suspension just prior to attainment of saturation with respect to neutral calcium hypochlorite depends upon the process of its preparation, it may sometimes be advantageous to obtain greater fluidity by chlorinating a more dilute lime suspension containing, for example, no more than about 28% Ca(OH)$_2$. In the case of other starting materials, for example as illustrated in Examples 3 to 7, the suspension should be suitably diluted to maintain adequate fluidity of the suspension by adding at least as much water as is equivalent to a 33% by weight suspension of Ca(OH)$_2$, on the basis of neutral calcium hypochlorite that can be produced therefrom. For economic reasons, it is preferable that the suspension be at least of a concentration, on the basis of neutral calcium hypochlorite that can be produced therefrom, equivalent to 20% by weight suspension of Ca(OH)$_2$.

The crystallization process of my invention may be varied in a number of respects without departing from the conditions defining my invention as above set forth. Thus, in a preferred method of carrying out the process of my invention, at or just before saturation of the liquid phase of the solution or suspension with respect to the desired neutral calcium hypochlorite product, a small quantity of pre-formed crystals may be added. The amount of such added crystals may range from 10 per cent to 20 per cent or more of the final crystal crop.

The following examples are illustrative of the process of my invention:

Example 1

A water suspension of lime containing about 26.5% Ca(OH)$_2$ was chlorinated to about 69% completion. Barium chloride in excess of the sulfate content of the suspension was then added, and the suspension was refrigerated to 13° C. Chlorination was continued with gaseous chlorine at the rate of 1.5% of the "final chlorine equivalent" per minute to about 95% completion with refrigeration such that the final temperature of the suspension was 24° C. Well-formed crystals of neutral calcium hypochlorite with a minimum of "crystal fines" precipitated during the second chlorination stage.

Example 2

A water suspension of lime containing about 32% Ca(OH)$_2$ was chlorinated to about 58% completion. Barium chloride in excess of the sulfate content of the suspension was then added and the suspension was refrigerated to 15° C. Chlorination was continued with gaseous chlorine at the rate of about 1.3% of the "final chlorine equivalent" per minute to about 93% completion with refrigeration such that the final suspension was 19° C.

Another water suspension of lime containing about 32% Ca(OH)$_2$ was chlorinated to about 61% completion. Barium chloride in excess of the sulfate content of the suspension was then added and the suspension was cooled. The above suspension chlorinated to 93% completion was admixed in the proportion of about one part by weight Ca to one part by weight Ca in the suspension chlorinated to 61% completion, and the resulting suspension was refrigerated to 14° C. Chlorination was then continued with gaseous chlorine at the rate of about 1.5% of the "final chlorine equivalent" per minute to about 93% completion with the refrigeration such that the final temperature of the suspension was 20° C. Well-formed, relatively easily filterable crystals of neutral calcium hypochlorite with a minimum of "crystal fines" were produced.

Example 3

A filter cake consisting substantially of dibasic calcium hypochlorite containing 31.2% Ca(OCl)$_2$, 30.9% Ca(OH)$_2$, 5.0% CaCl$_2$ prepared by known methods was mixed with an equal weight of water and with barium chloride in excess of the sulfate content of the suspension. The resulting suspension was chlorinated to 0.73% OH$^-$ in 29 minutes, the temperature being maintained in the range of 15-25° C. Well-formed crystals of neutral calcium hypochlorite with a minimum of "crystal fines" were produced.

Example 4

A filter cake consisting substantially of ⅔— basic calcium hypochlorite containing 37.2% Ca(OCl)$_2$, 10.8% Ca(OH)$_2$, 11.5% CaCl$_2$, and containing negligible sulfate content prepared by known methods from lime which had been leached and washed to remove sulfate was mixed with 64 parts by weight of water per 100 parts by weight of filter cake. The resulting suspension was chlorinated to 0.20% OH$^-$ in 5 minutes, the temperature being maintained in the range of 15-20° C. Well-formed crystals of neutral calcium hypochlorite with a minimum of "crystal fines" were produced.

Example 5

A water suspension of lime containing about 20% Ca(OH)$_2$ was chlorinated to near completion and filtered to yield a solution containing 19.5 grams Ca(OCl)$_2$/18 grams CaCl$_2$/100 grams H$_2$O. With this solution was mixed a filter cake consisting substantially of dibasic calcium hypochlorite containing 35.6% Ca(OCl)$_2$, 36.9% Ca(OH)$_2$, 3.0% CaCl$_2$ in the proportion of about 0.38 parts by weight of filter cake per part by weight of solution and barium chloride was added in excess of the sulfate content of the suspension. The resulting suspension was chlorinated to near completion in 30 minutes, the temperature being maintained in the range of 15-25° C. Well-formed crystals of neutral calcium hypochlorite with a minimum of "crystal fines" were produced.

Example 6

A suspension of lime in caustic solution containing about 12.8% Ca(OH)$_2$ and 13.8% NaOH was chlorinated to about 70% completion. Barium chloride in excess of the sulfate content of the suspension was then added, and the suspenion was refrigerated to 15° C. Chlorination was continued at the rate of 1.3% of the "final chlorine equivalent" per minute to about 96% completion, the temperature being maintained in the range of 15–25° C. Well-formed crystals of neutral calcium hypochlorite with a minimum of "crystal fines" were produced.

*Example 7*

A suspension of lime in caustic solution containing about 12.8% $Ca(OH)_2$ and 13.8% NaOH was chlorinated to about 79% completion. Barium chloride in excess of the sulfate content of the suspension was then added, and the suspension was refrigerated to 15° C. The final chlorinated suspension from Example 6 was admixed in the proportion of about 0.20 part by weight Ca in the Example 6 suspension to 0.80 part by weight Ca in the suspension chlorinated to 70% completion. Chlorination was then continued with gaseous chlorine at the rate of about 1% of the "final chlorine equivalent" per minute to about 95% completion, the temperature being maintained in the range of 15–25° C. Well-formed crystals of neutral calcium hypochlorite of considerably larger size than the crystal of Example 6 with a minimum of "crystal fines" were produced.

*Example 8*

An aqueous solution containing about 40% NaOH to which barium chloride was added in excess of the sulfate content was chlorinated and filtered to yield a solution containing about 51 grams NaOCl/9 grams NaCl/1 gram NaOH/100 grams $H_2O$. To this solution at about 15° C. was added a water solution containing 46% $CaCl_2$ over a period of 40 minutes in the proportion of one equivalent of calcium ion per equivalent of hypochlorite ion. Well-formed crystals of neutral calcium hypochlorite with a minimum of "crystal fines" were produced.

The above description of the process of my invention is to be interpreted as illustrative only and my invention it not limited except as set forth in the claims which follow.

I claim:

1. In a process for precipitation of neutral calcium hypochlorite by chlorination of a basic aqueous mixture containing calcium ions, the improvement which comprises adding chlorine to the mixture, at least from the time the liquid phase of the mixture is saturated with respect to neutral calicum hypochlorite, at a rate of at least 0.5% per minute of the "final chlorine equivalent" of the mixture, maintaining the liquid phase of the mixture substantially free of sulfate ion during the precipitation, maintaining the calcium chloride concentration in said liquid phase during said precipitation below about 35 parts by weight calcium chloride per 100 parts water, and carrying out the precipitation at a temperature below about 30° C.

2. In a process for precipitation of neutral calcium hypochlorite by chlorination of a basic aqueous mixture containing calcium ions, the improvement which comprises adding chlorine to the mixture, at least from the time the liquid phase of the mixture is saturated with respect to neutral calcium hypochlorite, at a rate of at least 0.5% per minute of the "final chlorine equivalent" of the mixture, maintaining soluble sulfate in said aqueous mixture during said precipitation below about 0.3 parts by weight, calculated as $CaSO_4$, per 100 parts of calcium present in the mixture, maintaining the calcium chloride concentration in the liquid phase of the mixture during said precipitation below about 35 parts by weight calcium chloride per 100 parts water, and carrying out the precipitation at a temperature below about 30° C.

3. In a process for precipitation of neutral calcium hypochlorite by chlorination of a basic aqueous mixture containing calcium ions, the improvement which comprises adding chlorine to the mixture, at least from the time the liquid phase of the mixture is saturated with respect to neutral calcium hypochlorite, at a rate of at least 1% per minute of the "final chlorine equivalent" of the mixture, maintaining soluble sulfate in said aqueous mixture during said precipitation below about 0.15 parts by weight, calculated as $CaSO_4$, per 100 parts of calcium present in the mixture, maintaining the calcium chloride concentration in the liquid phase of the mixture during said precipitation below about 35 parts by weight calcium chloride per 100 parts water, maintaining sufficient water in the aqueous mixture to insure fluidity, and carrying out the precipitation at a temperature below about 30° C.

4. In a process for precipitation of neutral calcium hypochlorite by chlorination of an aqueous suspension of calcium hydroxide, the improvement which comprises adding chlorine to the mixture, at least from the time the liquid phase of the mixture is saturated with respect to neutral calcium hypochlorite, at a rate of at least 0.5% per minute of the "final chlorine equivalent" of the mixture, adding seed crystals of neutral calcium hypochlorite to the mixture in a minor amount as compared to the expected crystal crop, before appreciable spontaneous crystallization occurs, maintaining the mixture adequately fluid during said precipitation by having present at least the amount of water to make the mixture equivalent to a 33% by weight suspension of $Ca(OH)_2$, on the basis of neutral calcium hypochlorite that can be produced therefrom, maintaining soluble sulfate in said aqueous mixture during said precipitation below about 0.3 parts by weight, calculated as $CaSO_4$, per 100 parts of calcium present in the mixture, maintaining the calcium chloride concentration in the liquid phase of the mixture during said precipitation below about 35 parts by weight calcium chloride per 100 parts water, and carrying out the precipitation at a temperature below about 30° C.

5. In a process for precipitation of neutral calcium hypochlorite by chlorination of an aqueous suspension of calcium hydroxide, the improvement which comprises employing a suspension of about 20% to 33% by weight $Ca(OH)_2$ content, adding chlorine to the mixture, at least from the time the liquid phase of the mixture is saturated with respect to neutral calcium hypochlorite, at a rate of about 1 to 2% per minute of the "final chlorine equivalent" of the mixture, maintaining soluble sulfate in said aqueous mixture during said precipitation below about 0.15 parts by weight calculated as $CaSO_4$, per 100 parts of calcium present in the mixture, and carrying out the precipitation at a temperature in the range of about 10° to 25° C.

6. In a process for precipitation of neutral calcium hypochlorite by chlorination of an aqueous suspension of calcium hydroxide, the improvement which comprises employing a suspension of about 20% to 28% by weight $Ca(OH)_2$ content, adding chlorine to the mixture, at least from the time the liquid phase of the mixture is saturated with respect to neutral calcium hypochlorite, at a rate of about 1 to 2% per minute of the "final chlorine equivalent" of the mixture, maintaining soluble sulfate in said aqueous mixture during said precipitation below about 0.15 parts by weight calculated as $CaSO_4$, per 100 parts of calcium present in the mixture, and carrying out the precipitation at a temperature in the range of about 10° to 25° C.

7. In a process for precipitation of neutral calcium hypochlorite from an aqueous mixture, the improvement which comprises completing the addition of the precipitation reagent within a period of about 60 minutes after the liquid phase of the aqueous mixture has passed the saturation point with respect to neutral calcium hypochlorite, maintaining the liquid phase of the mixture substantially free of sulfate ion during the precipitation, maintaining the calcium chloride concentration in said liquid phase during said precipitation below about 35 parts by weight calcium chloride per 100 parts water, maintaining sufficient water in the aqueous mixture to ensure fluidity, and carrying out the precipitation at a temperature below about 30° C.

JEROME W. SPRAUER.

REFERENCES CITED

The following references are of record in the file of this patent:

UNITED STATES PATENTS

| Number | Name | Date |
|---|---|---|
| 1,937,230 | Kitchen | Nov. 28, 1933 |
| 2,007,429 | Klopstock | July 9, 1935 |
| 2,320,635 | Mericola et al. | June 1, 1943 |
| 2,368,042 | Robson | Jan. 23, 1945 |

FOREIGN PATENTS

| Number | Country | Date |
|---|---|---|
| 487,009 | Great Britain | June 14, 1938 |